United States Patent [19]

Tachibana et al.

[11] Patent Number: 4,810,086

[45] Date of Patent: Mar. 7, 1989

[54] PORTABLE MICROFILM READER

[75] Inventors: Hajime Tachibana; Eichi Saito; Hiroshi Fukuda, all of Tokyo; Tetsuo Udagawa; Koji Ohgaki; Shigeru Kojima, all of Saitama, Japan

[73] Assignee: Fuji Photo Film Co., Ltd., Kanagawa, Japan

[21] Appl. No.: 48,300

[22] Filed: May 11, 1987

[30] Foreign Application Priority Data

May 9, 1986 [JP] Japan .................................. 61-106498

[51] Int. Cl.[4] .............................................. G03B 21/30
[52] U.S. Cl. ......................................... 353/79; 353/77; 353/72; 353/26 R
[58] Field of Search ..................................... 353/72–79, 353/52, 55, 26 R, 26 A

[56] References Cited

U.S. PATENT DOCUMENTS

| 3,479,116 | 11/1969 | Anderson | 353/77 |
| 3,704,054 | 11/1972 | Robak | 353/77 X |
| 3,785,728 | 1/1974 | Peters | |
| 3,870,411 | 3/1975 | Schwartz | 353/73 |
| 4,170,408 | 10/1979 | Behr | 353/79 X |
| 4,564,276 | 1/1986 | Hofmann | 353/77 X |
| 4,629,299 | 12/1986 | Okano | 353/79 X |

FOREIGN PATENT DOCUMENTS

| 0154195 | 9/1985 | European Pat. Off. . | |
| 0173325 | 3/1986 | European Pat. Off. . | |
| 2604204 | 8/1977 | Fed. Rep. of Germany . | |
| 2174166 | 10/1978 | Fed. Rep. of Germany . | |
| 2576428 | 7/1986 | France . | |
| 0172641 | 10/1983 | Japan | 353/79 |
| 58-17641 | 10/1983 | Japan . | |

OTHER PUBLICATIONS

Patent Abstracts of Japan, vol. 8, No. 10 (P-248) 1447, Jan. 18, 1984.

Primary Examiner—Harry N. Haroian
Attorney, Agent, or Firm—Sughrue, Mion, Zinn, Macpeak, and Seas

[57] ABSTRACT

A microfilm reader which has an optical system for magnifying and projecting an image recorded on a film contained a cassette onto a viewing screen mounted on a pivot shaft of a casing having a generally rectangular flattened box-like configuration of the microfilm reader for folding and unfolding movement comprises a cassette holder, a microfilm driving device for transporting the microfilm so as to place a frame of the microfilm of which an image is to be projected, a reflection mirror supported by the casing for sliding movement so as to be foldable in order to turn the projected image toward the viewing screen, a top cover mounted on and supported by the casing for folding and unfolding movement which is slidably engaged with a top end of the viewing screen so as to define a dark space behind the viewing screen in cooperation therewith when the viewing screen is unfolded and to cover and protect the viewing screen when the viewing screen is folded, and linking device interconnecting the viewing screen and the reflecting mirror so as to fold and unfold the reflecting mirror in cooperation with the viewing screen. The microfilm reader comprises a light shielding member comprising a plurality of light opaque blades which is unfolded in cooperation with the viewing screen so as to close a side opening defined by the casing, the viewing screen and the top cover when the viewing screen is unfolded in order to provide a dark space behind the viewing screen.

16 Claims, 10 Drawing Sheets

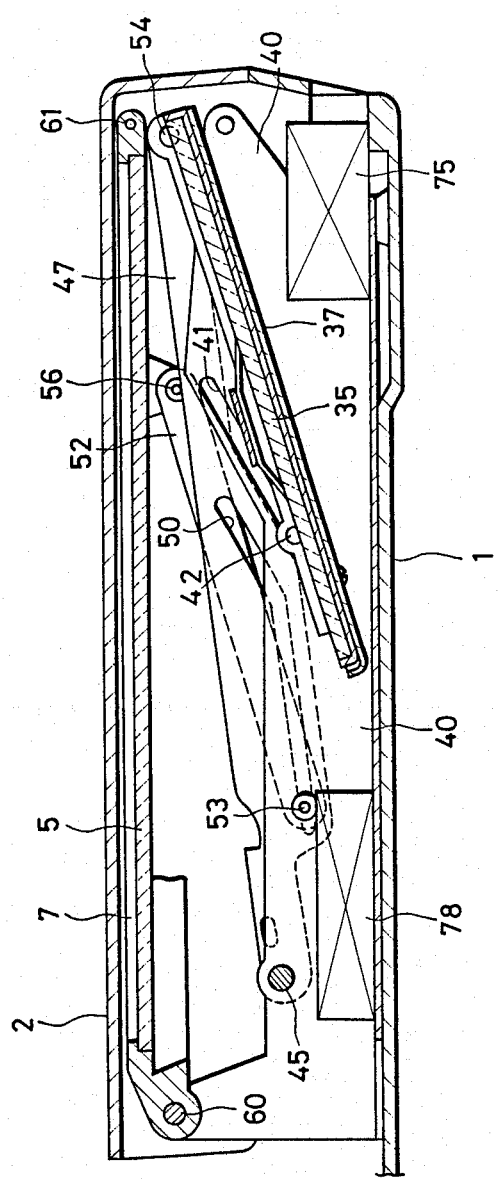

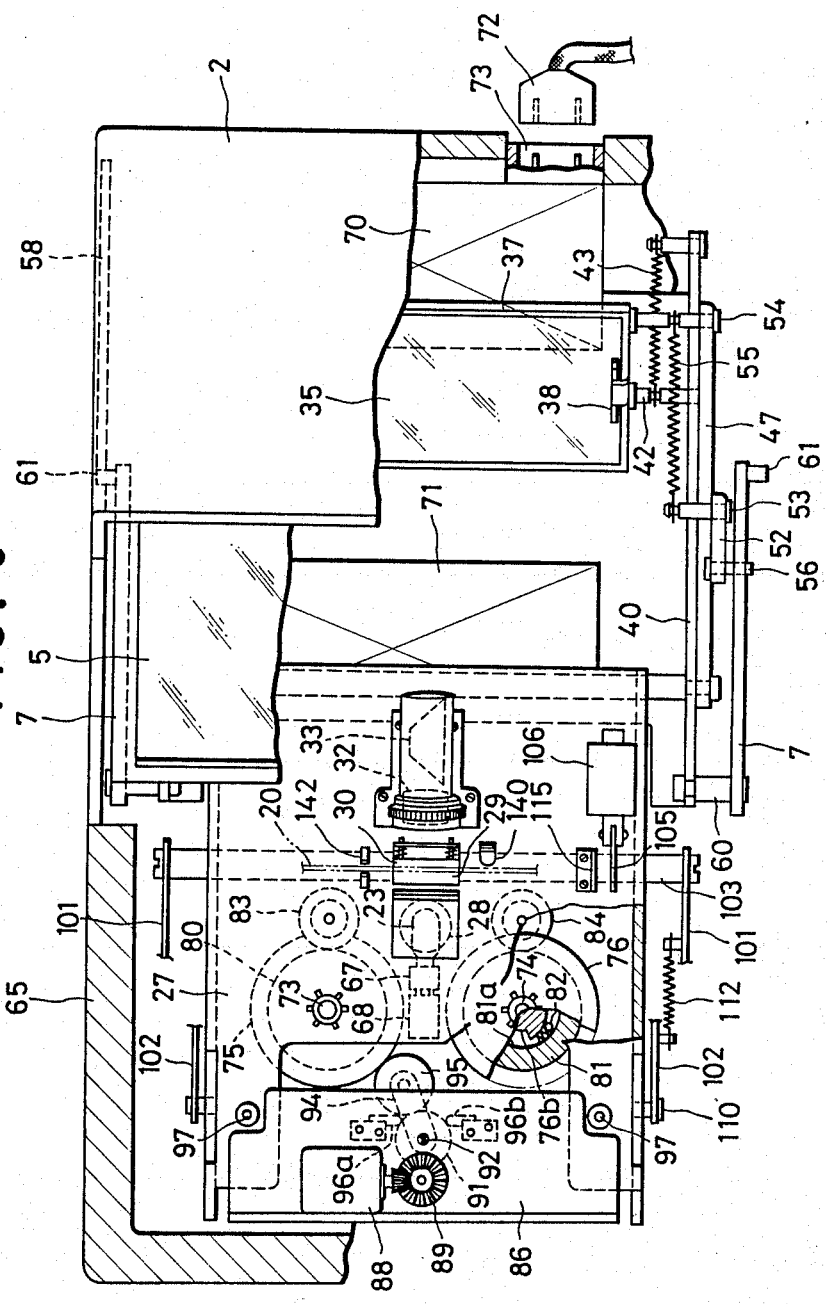

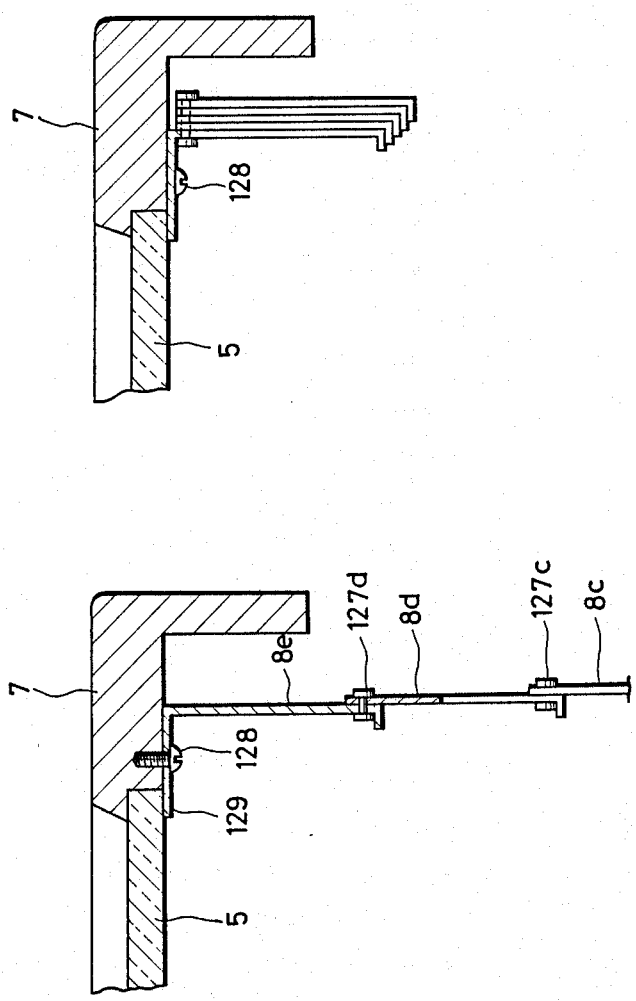

PORTABLE MICROFILM READER

BACKGROUND OF THE INVENTION

The present invention relates to a portable microfilm reader for projecting images recorded on a microfilm onto a self-contained viewing screen and more particularly, to a microfilm reader which can be folded in the form of a flattened box-like configuration for carrying convenience.

Microfilm readers are widely used to retrieve and view any one of a great number of images of documents, drawings and the like recorded on a small size of microfilm, for example a 16 mm microfilm. In such a microfilm reader, each frame of the microfilm has to be magnified to A-4 image size. As is well known in the art, the microfilm reader comprises a microfilm loading section; an illumination section for illuminating a retrieved frame of the microfilm; an optical system including a reflection mirror for magnifying and projecting each frame of the microfilm; and a viewing screen onto which a magnified image is projected.

Among these microfilm readers, there has been known a compact, foldable microfilm reader provided with a viewing screen capable of being folded or pushed down toward a main body of the microfilm reader containing the microfilm loading section and the illumination section therein, the microfilm reader being disclosed in U.S. Pat. Nos. 3,667,839, 3,700,321, 3,785,728, 3,814,514, 4,432,619, 3,625,333, DE Pat. Nos. 3,223,906, and 3,034,401. Further disclosed in U.S. Pat. No. 4,640,597 is a microfilm reader which can be folded in the form of a generally flattened box-like configuration. Such a microfilm reader can be folded compact, thereby very convenient to carry about.

In the above-described conventional microfilm reader of the type having a viewing screen capable of being pushed down, the viewing screen is left open to the view when the viewing screen is pushed down to fold the microfilm reader. For this reason, the surface of the viewing screen is apt to get scratched and, in the extreme case, to be damaged when being carried about.

For increasing contrast of the image projected on the viewing screen unfolded or risen up at a certain angle, the microfilm reader requires preventing ambient light from streaming behind the viewing screen. For this requirement, the microfilm reader of this type is further provided with a light shielding hood for enclosing a space behind the viewing screen in a box-like shape when the viewing screen is up. The light shielding hood should be desirably folded and laid under the viewing screen when the viewing screen is pushed down. The microfilm reader provided with such a box-like hood is complicated in structure, in particular, in folding mechanism for the box-like hood and disadvantageous in respect of space saving. Furthermore, the provision of the complicated, space consuming hood folding mechanism is an obstacle to the compactness of the microfilm reader.

In view of the above, an improved compact, foldable microfilm reader has been proposed in U.S. Pat. No. 4,629,299 assigned to the same assignee of the present application. The microfilm reader disclosed therein comprises a viewing screen capable of being pushed down and a top cover which are independently provided and supported. Furthermore, the microfilm reader requires to pull out a slide member supported by its main body before the viewing screen is up. The provision of the slide member with its associated members makes the microfilm reader complicated in structure and inconvenient in operation.

OBJECT OF THE INVENTION

It is, therefore, an object of the present invention to provide a portable micro reader provided with a foldable viewing screen which is covered when folded.

It is another object of the present invention to provide a microfilm reader in which a reflecting mirror is folded and unfolded in cooperation with the folding and unfolding movement of a viewing screen.

It is still another object of the present invention to provide a microfilm reader in which a space behind a viewing screen is shielded by foldable light shielding means simplified in structure.

It is a further object of the present invention to provide a microfilm reader in which light shielding means is folded and unfolded in cooperation with the folding and unfolding movement of a viewing screen.

SUMMARY OF THE INVENTION

In order to achieve the above and other objects and advantages of the present invention, the microfilm reader comprises a generally rectangular flattened box-like main body; means for accommodating a cassette containing a microfilm on which a great number of images are recorded; an optical system including a reflecting mirror for magnifying and projecting an image on the microfilm on a viewing screen which is mounted on and supported by the main body for pivotal movement in order to fold and unfold the microfilm reader; a top cover mounted on and supported by the main body for pivotal movement in cooperation with the viewing screen, said top cover defining a space behind the viewing screen when the viewing screen is risen up and laying over the viewing screen when the viewing screen is pushed down; and means for operationally interconnecting the viewing screen and the reflecting mirror so as to move the reflecting mirror in cooperation with the viewing screen.

According to a feature of the present invention, the microfilm reader is unfolded to its in-use position only by rising up the top cover and folded down in the form of a generally rectangular flattened box-like configuration in such a way to lay the top cover over the viewing screen. The provision of the top cover can contribute to prevent the viewing screen from taking scratches and being accidentially damaged when being carried about. The provision of the light shielding means makes it easy to form a dark space between the viewing screen and the top cover when the microfilm reader is unfolded to its in-use position because of the cooperation with the viewing screen.

The light shielding means comprises a plurality of light opaque blades adapted to be folded and unfolded in cooperation with the rising-up and pushing-down movement of the viewing screen. The light opaque blades are coaxially pivoted at their one ends and connected at their opposite ends to one another through pin-slot engagement so as to be unfolded partially overlapping on one another in the form of a sector-like configuration to close a generally triangular side opening delimited by the main body, the top cover, and the viewing screen when the microfilm reader is unfolded and so as to be folded following the folding -down of the microfilm reader.

According to another feature of the present invention, the microfilm reader is provided with a display panel for displaying thereon information for retrieving a desired frame of the microfilm, information for necessary operations, and the like. The display panel desirably made of a liquid crystal panel is adapted to be risen up at a certain angle of inclination upon the microfilm cassette is loaded. The display panel facing upwards provide a clear view of the displayed information thereon.

BRIEF DESCRIPTION OF THE DRAWINGS

These and other objects and features of the present invention will become apparent from the following description taken in conjunction with preferred embodiments thereof with reference to the accompanying drawings, in which;

FIG. 7 is a cross sectional view of a part of the microfilm reader folded;

FIG. 8 is a schematic illustration showing the detail of an interior mechanism of the microfilm reader;

FIG. 14 is a schematic illustration of a part of the light shielding means unfolded; and FIG. 15 is a schematic illustration of the part of the light shielding means folded.

Before the description of the present invention proceeds, it is to be noted that like parts are designated by like reference numerals and symbols throughout the views of the accompanying drawings.

DETAILED DESCRIPTION OF THE INVENTION

Figure 1:
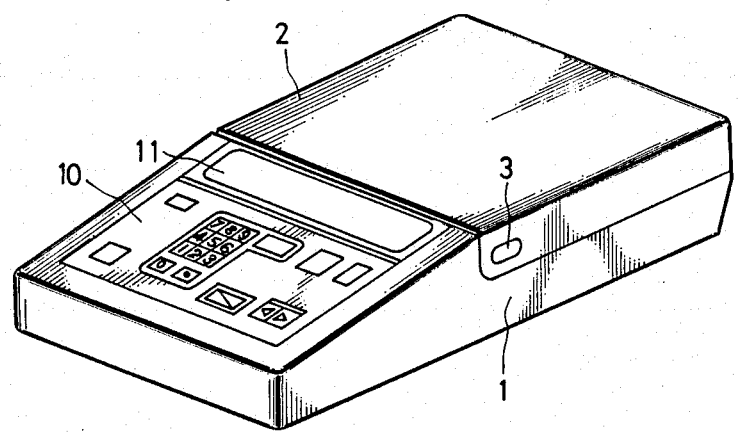
FIG. 1 is a perspective view of the microfilm reader folded according to a preferred embodiment of the present invention.
Figure 2:
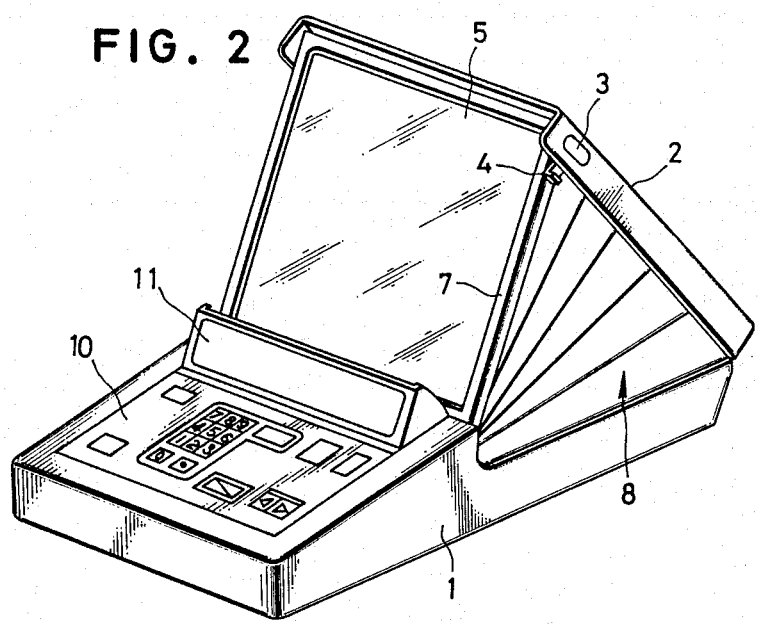
FIG. 2 is a perspective view of the microfilm reader of FIG. 1 when in-use.

FIGS. 1 and 2 show a microfilm reader embodying the present invention in folded and unfolded positions, respectively. The microfilm reader has a generally rectangular flattened box-like configuration, and includes a top cover 2 attached to the rear end of main body 1 for movement between risen-up and pushed-down positions. The top cover 2 is risen up to unfold the microfilm reader. For rising up the top cover 2, there is a push button 3 provided on one or both sides of the top cover 2. When pushing the button 3, a hook 4 is disengaged from the main body 1 to allow the top cover 2 to rise up under the influence of force of its associated spring which will be described later. Following the rising-up of the top cover 2, a viewing screen 5 rises up gently.

Between a screen frame 7 attached with the viewing screen 5 thereto and the main body 1, there are light shielding means 8 on both sides thereof. Each light shielding means 8 is formed by a plurality of opaque blades which spread or unfold to assume a generally sector shape with the rising up of the top cover 2 so as to cover a generally triangular side opening delimited by the main body 1, the top cover 2, and the viewing screen 5 as is best shown in FIG. 2. Since the top cover 2 is of an opaque member, a space behind the viewing screen 5 is prevented from ambient light.

At a front section of the main body 1, there are a keyboard 10 and a liquid crystal display panel 11. The liquid crystal display panel 11 is, when the microfilm reader is used, risen and faced upwards as is shown in FIG. 2 to display information thereon. The keyboard 10 and the liquid crystal display panel 11 are, as will be described in more detail later in association with FIG. 4, swingable up together for allowing loading and unloading a microfilm cassette 12 therefrom.

Figure 3A:
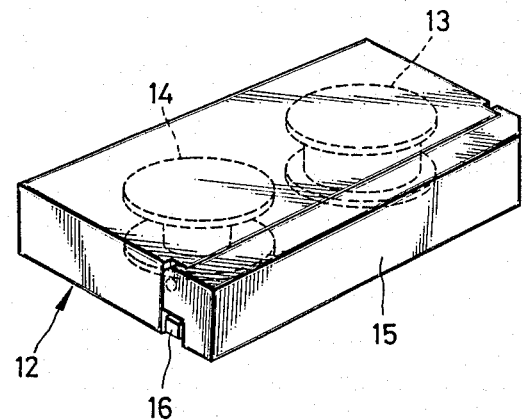
FIGS. 3 (A) and (B) are perspective views of a microfilm cassette for use with the microfilm reader, a guard panel of the cassette being closed and opened, respectively.
Figure 3B:
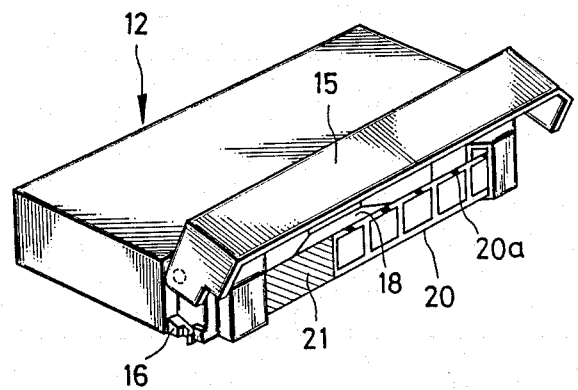

The microfilm cassette 12 is, as is clearly shown in FIG. 3(A), provided with a microfilm supply reel 13 and a microfilm take up reel 14 therein and with a guard panel 15 which usually closes a front opening of the cassette 12 and is locked in its closing position. As is shown in FIG. 3(B), when a release member 16 is pushed, the guard panel 15 is allowed to open in order to expose part of a microfilm 20 contained in the microfilm cassette 12. The microfilm 20 is, at its leading end, provided with a magnetic tape 21 on which information necessary for retrieving each image on the microfilm 20 is recorded. At the beginning of taking up the microfilm 20, the retrieval information is read by a magnetic head and is displaied on the liquid crystal display panel 11. On a margin of the microfilm 20, blip marks 20a are recorded one for each image frame. As is well known in the art, the blip marks 20a can be optically detected and counted with the forwarding of the microfilm 20. At the front bottom of the microfilm cassette 12, there is formed a space 18 for allowing a part of an optical system therein so as to illuminate the microfilm 20 from the rear side thereof as is shown in more detail in FIG. 6.

Figure 4:
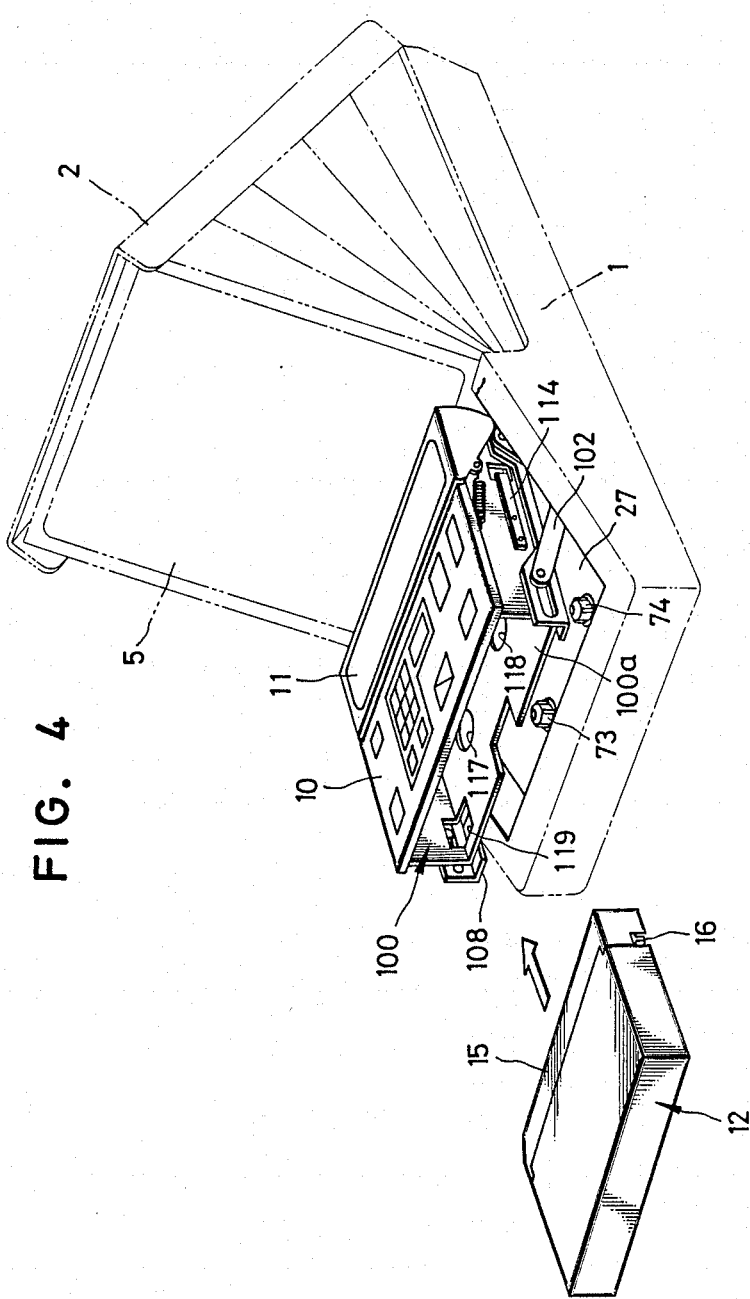
FIG. 4 is a perspective view showing a cassette holder popped up.

A cassette holder 100 is provided in the front section of the main body 1 of the microfilm reader and adapted to pop up so as to allow loading and unloading the microfilm cassette 12 from the cassette holder 100 as is shown in FIG. 4. After loading the microfilm cassette 12 into the cassette holder 100, the keyboard 10 is pushed down in the front portion of the main body 1 as is shown in FIG. 2 and locked therein. In the course of inserting the microfilm cassette 12 into the cassette holder 100, the release member 16 is pushed with a release lever 114 so as to render the guard panel 15 openable. When the cassette holder 100 is pushed down and falls within the main body 1 of the microfilm reader, then the guard panel 15 is risen up to open as is shown in FIG. 3(B), thereby forcing the liquid crystal display panel 11 to rise as is shown in FIG. 2 for readying the microfilm reader for use. Upon locking the cassette holder 100 within the main body 1, driving shafts 22 and 23 are brought into engagement with hubs formed at the end of the reels 13 and 14 of the microfilm cassette 12.

One of the driving shafts 22 and 23 is, with the aid of a motor incorporated in the main body 1, forced to rotate and the other follows the one so as to forward the microfilm 20.

Figure 5:
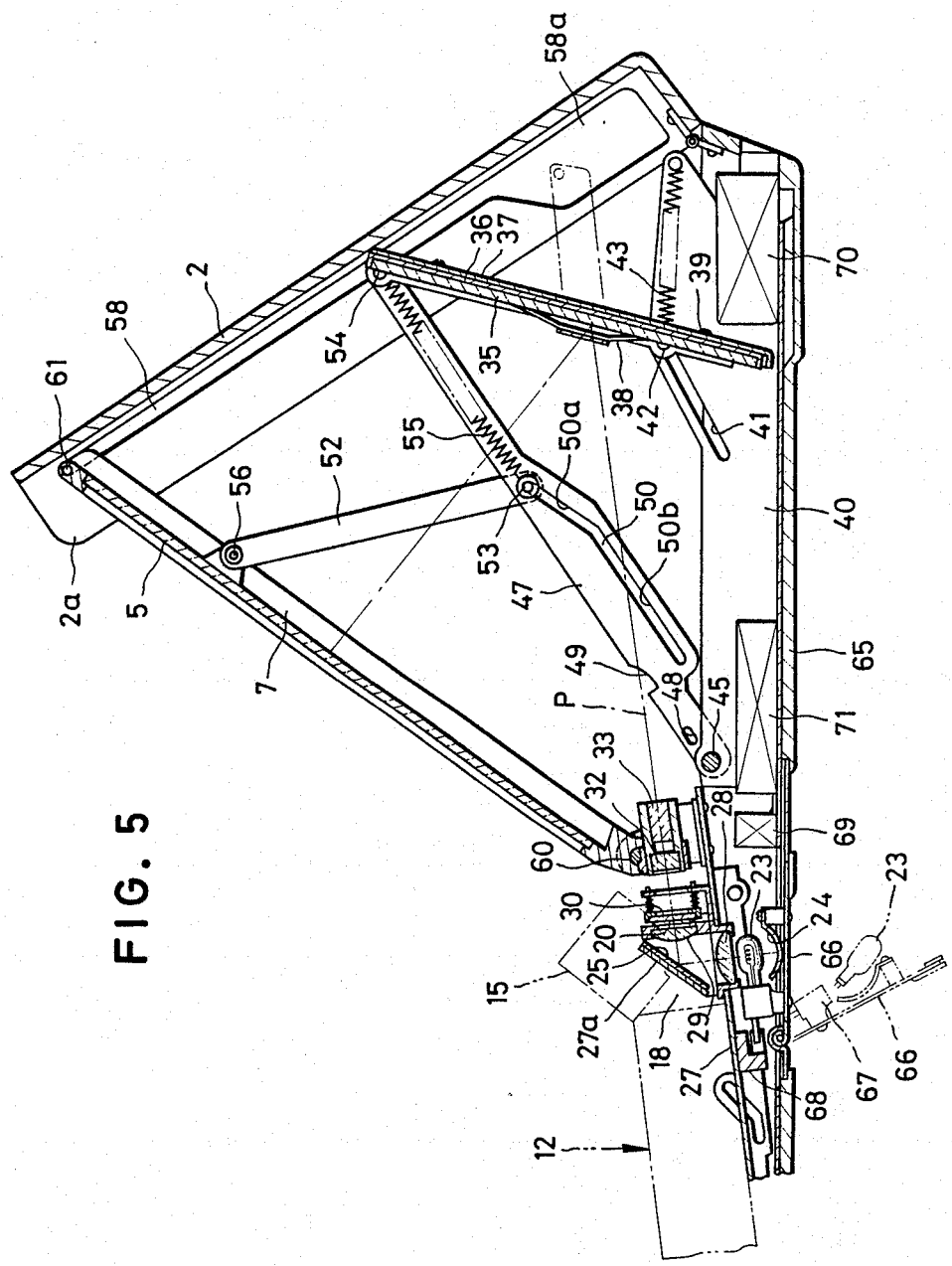
FIG. 5 is a cross sectional view showing the detail of an interior mechanism including an image projecting optical system and a viewing screen rising-up mechanism.
Figure 6:
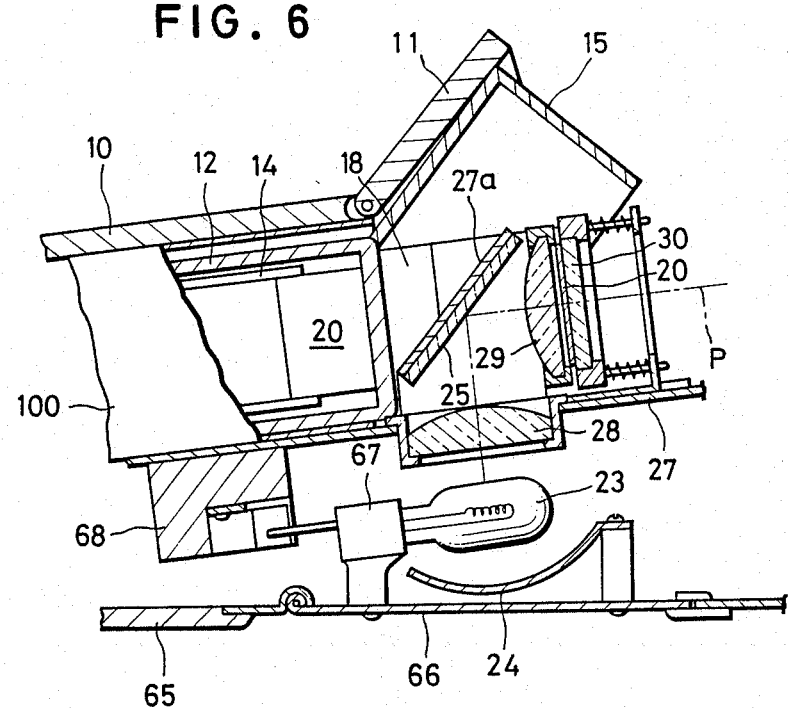
FIG. 6 is an enlarged cross sectional view of a part of FIG. 5.

In FIGS. 5 and 6 showing an optical arrangement of the microfilm reader which is ready for use, there is a cold mirror 25 supported by a raised and bent portion 27a of a chassis 27 of the main body 1. The cold mirror 25 is positioned within the front space 18 of the microfilm cassette 12 when the cassette holder 100 is pushed down and falls within the front section of the main body 1. The cold mirror 25 is so disposed as to reflect light directly from a lamp 23 and reflected by a reflector 24 to illuminate a frame of the microfilm 20, thereby to project an image of the frame forward. As is well known in the art, the cold mirror 25 is so designed as to reflect visible light but to pass infrared light therethrough, preventing the microfilm 20 from being excessively heated. The raised and bent portion 27a advantageously serves as a heat releasing member for absorbing and releasing heat passed through the cold mirror 25.

The cold mirror 25 is, as is well known in the art, of an integral multilayer interference thin film. Although it is expensive to use such an integral multilayer interference thin film for the cold mirror 25, nevertheless, as the cold mirror 25 of integral multilayer interference thin film can be advantageously made smaller in comparison with other mirrors disposed near the lamp 23, the provision of the cold mirror 25 of integral multilayer interference thin film makes it possible to compactly arrange the optical system and thereby to manufacture the microfilm reader inexpensive as a whole.

On the chassis 27, there are a condenser lens 28 and 29, a pressure plate 30, a projection lens 32, and a trapezoidal prism 33 for changing image position. The condenser lenses 28 and 29 are disposed before and after the cold mirror 25 in an optical path P. The provision of these condenser lenses 28 and 29 is advantageous to shorten the whole length of the optical path P as well as to improve condensing efficiency. The pressure plate 30 is so adapted as to be movable along the optical path P. More specifically, the pressure plate 30 is moved rearward with the aid of well known means such as a solenoid (not shown) when the cassette holder 100 is risen up for loading the microfilm cassette 12 thereinto, so as to make it easy to place the microfilm 20 in a film gate between the pressure plate 30 and the one of the condenser lens 29 and to prevent the microfilm from fluttering. The projection lens 32 is supported for rectilinear movement for focus adjustment. As is well known in the art, the trapezoidal prism 33 acts to reverse an image projected by the projection lens 32 right side left so as to display the image in a right posture on the viewing screen 5. For displaying the image on the viewing screen 5, there is a reflection mirror 35 to reflect the projected image through the trapezoidal prism 33 and to direct the reflected image upwards and toward the viewing screen 5. If images are previously recorded on the microfilm 20 in such a way that these images projected by the projection lens 32 and reflected by the reflection mirror 35 take a right posture on the viewing screen 5, the trapezoidal prism 33 can be omitted. As a preferred modification, the trapezoidal prism 33 may be so adapted as to be rotatable about the optical path P to rotate the projected image on the viewing screen 5.

As is shown clearly in FIG. 5, the reflection mirror 35 is attached with a supporting plate 36 through which the reflection mirror 35 is attached to a frame 37. Between the frame 37 and the mirror surface of the reflection mirror 35 are leaf springs 38 disposed on the both sides thereof. Each leaf spring 38 is adapted to act in such a way to adjust the angle of inclination of the reflection mirror 35 with respect to the frame 37 by fastening a screw 39 threadingly engaged with the frame 37. On one side of the frame 37 is a laterally extending pin 42 which in turn is engaged with a straight slot 41 formed in a side wall 40 of the main box 1. Between the pin 42 and the side wall 40 is a compression spring 43 suspended for forcing the pin 42 rearward. On the other side of the frame 37 is a mirror control lever 47 which has one end pivoted on a shaft 45 of the side wall 40 and is formed with a slot 48 near the pivoted end, a notch 49, and a cam slot 50 therein.

The cam slot 50 which comprises a straight cam portion 50b and an inclined cam portion 50a, is engaged with a pin 53 extending from one end of a link lever 52 whose another end is pivotally mounted on a pin 56 of the screen frame 7. Between the pin 53 and a pin 54 connecting the mirror control lever 47 to the mirror frame 37 is a compression spring 55 to force the link lever 52 in the counterclockwise direction about the pin 56. Inside a side wall 2a of the top cover 2 is a guide groove 58 having a widened distal end portion 58a. The screen frame 7 is pivotally mounted at its one end on a shaft 60 fixed to the main body 1 for swing up and down movement and is provided with at its other end a pin 61 which slidably engages the guide groove 58.

When folding the microfilm reader, the screen frame 7 is pushed down to swing in the clockwise direction about the shaft 60. As a result, the link lever 52 is pivoted in the clockwise direction about the pin 56 through the engagement between the pin 53 and a sloped cam portion 50a of the cam slot 50 as the screen frame 7 is pushed down. At the beginning of the pivotal movement of the link lever 52, the top cover 2 is risen slightly upward. However, as the screen frame 7 is further pushed down, the pin 53 will slip out of the sloped cam portion 40a and enter into and slide within the continuing straight cam portion 50a of the cam slot 50 until the pin 53 abuts against an extremity of the straight cam portion 50b. Consequently, the screen frame 7 is folded up. While the screen frame 7 is folded, because of the slidable engagement between the pin 61 of the screen frame 7 and the guide groove 58, the top cover 2 is correspondingly pulled down to cover the viewing screen 5.

After the pin 53 has reached the extremity of the straight cam portion 50b of the cam slot 50, a further downward movement of the screen frame 47 forces the mirror control lever 7 to pivot about the shaft 45 in the clockwise direction. As is previously described, since the mirror frame 37 is connected to the one end of the mirror control lever 47 through the pin 54 for pivotal movement and is guided by the straight guide slot 41 formed in the side wall 40 of the main body 1 through the pin 42, the mirror frame 37 turns and slides toward the front portion of the main body 1 against the compression spring 43 as the mirror control lever 47 swings in the clockwise direction. At this time, the opaque blades 8a to 8e will be folded as will be described in detail later.

The mirror 35 and the top cover 2 are also folded in cooperation with the downward pivotal movement of the screen frame 7, but when the pin 61 of the screen frame 7 enters the widened end portion 58a of the guide groove 58 as is shown by a double-dotted line in FIG. 5, the top cover 2 is operationally disconnected from the screen frame 7. At this stage, by holding the top of the screen frame 7 with one hand and pushing down the top cover 2 with the other hand, the screen frame 7, and hence the mirror 35 are further folded through the engagement between the pin 61 of the screen frame 7 and the upper edge of the widened end portion 58a of the guide groove 58. At the time the top cover 2 is thoroughly pushed down to fold the microfilm reader, the hook 4 (shown clearly in Fig. 2) is brought into engagement with a recess formed in the inner surface of the side wall 40 of the main body 1, thereby the moving part of the microfilm reader is completely folded as is shown in FIG. 7 and the microfilm reader is held in a generally rectangular flattened box-like configuration shown in FIG. 1. In FIG. 7, the spring 43 and 55 and some other parts are omitted for simplicity.

When unfolding the microfilm reader, the push button 3 shown in FIG. 1 is pushed to release the top cover 2. As a result, the mirror frame 37, mirror control lever 47, and the link lever 52, which are all cooperated with one another as a link mechanism self-expandable under the influence of the compression springs 43 and 55, rise up to an in-use position shown in FIG. 5, so as to rise the screen 5 up. It should be noted that the springs 43 and 55 are desired to gently operate the link mechanism, otherwise that the link mechanism should be in cooperation with a damping mechanism well known per se. At an extremity of the upward movement of the top cover 2, the screen frame 7 is forced up so as to cause the pin 53 to enter into and slide within the sloped cam portion 50a of the cam slot 50. In such the way, the microfilm reader is completely unfolded and set up to the in-use position shown in FIG. 5.

As is clearly shown in FIGS. 5 and 6, part of a plastic outer casing which is attached with the metal side plate 40, is provided with a bottom plate 66 of metal mounted on and supported thereby for pivotal movement in order to open and close. On the bottom plate 66 are a lamp mount 67 for a lamp 23 and a reflector 24 fixed thereto. When the bottom plate 66 is opened as is shown by a double-dotted line shown in FIG. 5, the lamp mount 67 is electrically disconnected from a connector 68 fixed to the chassis 27 and the lamp 23 is exposed outside. This lamp arrangement makes it very easy to replace the existing lamp 23 with another. The provision of the metal bottom plate 66, which is not covered by the outer casing 65 and is directly exposed to the air, is advantageous to release heat emitted from the lamp 23. It is of course effective to provide a cooling fan 69 near the lamp 23.

Figure 9:
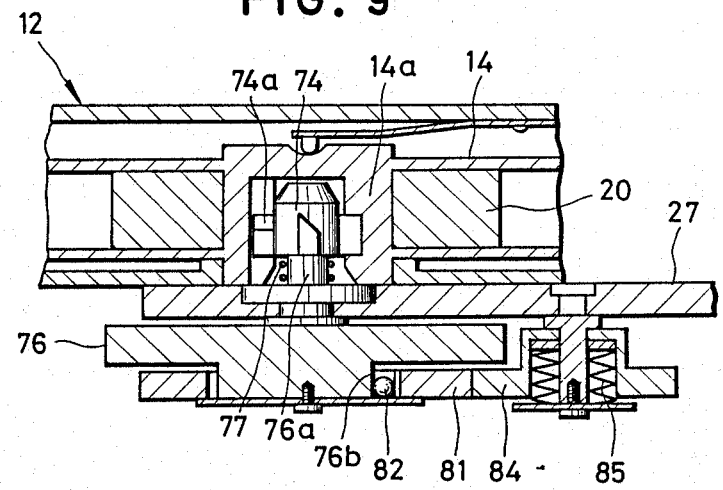
FIG. 9 is a cross sectional view of a reel gear and a braking gear.

Referring to FIGS. 8 and 9, inside the rear portion of the main body 1 of the microfilm reader, there are a power source unit 70 at the rear end and a control unit 71 at the middle. The power source unit 70 includes therein AC-AC converter and a voltage stabilizing circuit, and so forth therein and is provided with a socket 73 to be fitted with a plug 72 of a power supply. On the other hand, the control unit 71 comprises various circuits for controlling the operation of a motor for winding and rewinding the microfilm 20, counting frames of the microfilm 20, executing the retrieval of desired frames, and the like. Inside the front portion of the main body 1 of the microfilm reader below the keyboard 10, there are the cassette holder 100 for accommodating the microfilm cassette 12 therein, a microfilm driving mechanism including the motor, and their associated mechanisms and members which are relatively heavy. For this reason, the microfilm reader is usually apt to be unbalanced in weight distribution. In this embodiment, however, the microfilm reader is well balanced due to the power unit 70 having a relatively heavy weight located at the rear end of the main body 1. The microfilm reader thus well balanced is very convenient to carry around and can be installed on a desk without being rickety in use.

On the chassis 27 inclined at the same angle as the optical path P in an outer casing 65 is a pair of the driving shafts 73 and 74 rotatably mounted thereon. The driving shafts 73 and 74 can fit into hubs 14a (shown in FIG. 9) of the microfilm supply reel 14 and the microfilm take up reel 14 of the microfilm cassette 12, respectively, and are adapted to rotate either one of the two reels 13 and 14. The driving shafts 73 and 74 are caused to rotate as a result of the rotation of reel gears 75 and 76, respectively. As is instantly shown in FIG. 9 in association with the driving shaft 74, the driving shaft 74 is rotatable in cooperation with a shaft 76a of the reel gear 76 and movable on the shaft up and down.

The reel gears 75, 76 are coaxially rotatablly coupled to following gears 80 and 81 through one-way clutches, respectively. As is shown in more detail in FIGS. 8 and 9 in association with the reel gear 74 for the microfilm take up reel 14, the following gear 81 is caused to rotate as a result of the counterclockwise rotation of the reel gear 76 with the aid of the one-way clutch which comprises a spiral-shaped cam disk 76b formed integrally with the reel gear 76 and a clutch ball 82 rolling between the cam disk 76b and an inner wall 81a of the following gear 81. On the other hand, in association with the microfilm supply reel 13, the following gear 80 is caused to rotate only when the reel gear 75 rotates in the clockwise direction. The following gears 80 and 81 are cooperatively associated with braking gears 83 and 84, respectively. As is clearly shown in FIG. 8, because each braking gear 83, 84 is subjected to load from a compression spring 85 while rotating, each following gear 80, 81 brakes the corresponding reel gear 75, 76.

The reel gears 75 and 76 can be selectively rotatably coupled to a motor 88 fixed to a chassis 86 through a gear train comprising a bevel gear 89 fixedly attached with a spur gear 90 (see FIG. 10), an idler spur gear 91, and a coupling spur gear 95. The bevel gear 89 is in mesh with a bevel gear fixed to the output shaft of the motor 88 and rotated in the clockwise direction as a result of rotation of the motor 88, so as to rotate the idler spur gear 91 in meshed with the spur gear 90 in the counterclockwise direction. A oscillating lever 94 is mounted on a shaft 92 of the idler spur gear 91 for pivotal movement, which lever 94 has the coupling spur gear 95 rotatably mounted thereon and in mesh with the idler gear 91. Consequently, when the idler gear 91 rotates in the counterclockwise direction, the oscillating lever 94 will swing till it abuts against a stop member 96a due to the rotatable engagement between the idler and coupling spur gears 91 and 95. At an extremity of the oscillating movement of the oscillating lever 94, the coupling spur gear 95 is brought into mesh with the reel gear 75, thereby causing the reel gear 75 to rotate in the counterclockwise direction.

When the reel gear 75 rotates in the counterclockwise direction as a result of rotation of the motor 88 in such the way described above, the microfilm 20 around the take up reel 14 is rewound around the microfilm supply reel 13. On the other hand, the reel gear 76 which follows the rotation of the reel gear 75, rotates in the counterclockwise direction with a tension exerted on the microfilm 20. However, because the counterclockwise rotation of the reel gear 76 is transmitted to the following gear 81, the braking gear 84 is actuated to exert a frictional force on the reel gear 76. Consequently, upon rewinding the microfilm 20, it is ensured to apply a proper tension on the microfilm 20, and thereby to maintain a stabilized transportation of the microfilm 20. Consequently, even if the microfilm 20 being rewound at a high speed is stopped suddenly, not only the microfilm 20 is prevented from fluttering in the film gate and being scratched, but also the magnetic tape 21 is maintained in close contact with the magnetic head.

When the motor 88 is reversed in rotation so as to rotate the bevel gear 89 in the counterclockwise direction, oscillating lever 94 swings and abuts against a stop member 96b, bringing the coupling spur gear 95 into mesh with the reel gear 76 so as to rotate the microfilm take up reel 14, forwarding the microfilm 20. While the microfilm 20 is forwarding, the reel gear 75 rotates in the clockwise direction following the rotation of the reel gear 76 so as to exert load on the microfilm supply reel 13 through the following gear 80 and the braking gear 83. Therefore, the microfilm 20 will receive a proper tension. As is seen in FIG. 8, a positioning pin 97 is so disposed on the chassis 27 as to enter a hole formed in the bottom of the microfilm cassette 12 for positioning the microfilm cassette 12.

For loading the microfilm cassette 12, the cassette holder 100 is popped up as is shown in FIG. 4. In order to allow the popping-up of the cassette holder 100, there is a pop-up mechanism shown in FIGS. 10 and 11. On both sides of the chassis 27, there are self-expandable linkages, each comprising a pair of link levers 101 and 102 pivoted on each other at the middle. The link lever 101 has an lower distal end pivoted on a connecting shaft 103 fixed to the chassis 27 and an upper distal end fixed with a pin 107 which in turn is engaged with a straight-shaped guide slot 109 formed in a bottom plate 108 of the cassette holder 100. The other link lever 102 has a lower distal end fixed with a pin 110 which is engaged with a L-shaped cam slot 111 comprising a base portion 111a and a sloped portion 111b formed in the chassis 27 and an upper distal end pivoted on a pin 104 of the bottom plate 100 of the cassette holder 100. Mounted on the connecting shaft 103 is a hook lever 105 which is connected at an upper portion to a plunger of a solenoid 106. When the solenoid 106 is energized, the plunger is retracted to move the hook lever 105 to a released position shown in FIG. 10. On the other hand, when the solenoid is deenergized, the plunger is forced out by a spring incorporated in the solenoid 106 to move the hook lever 105 to an engaging position shown in FIG. 11. Between these link levers 101 and 102, there is a compression spring 112 which serves to expand the link levers 101 and 102.

On one side of the cassette holder 100, a release member 114 mainly comprising a leaf spring with its distal end bent inward is provided in such a way that the distal end extends laterally inside the cassette holder 100. With the aid of the distal end of the release member 114, the release member 16 is pushed when the microfilm cassette 12 is inserted into the cassette holder 100 popped up so as to release the guard panel 15 and render the same openable. After the insertion of the microfilm cassette 12 into the cassette holder 100, the cassette holder 100 is depressed down and within the main body 1 for projecting images on the microfilm 20.

While the cassette holder 100 is depressed, the raised and bent portion 115 of the chassis 27 abuts on a lower edge of the guard panel 15, thereby pushing up the guard panel 15 being followed by the rising of the liquid crystal display panel 11. At the end of the loading operation of the microfilm cassette 12, the solenoid 106 is deenergized to force out the plunger so as to move the hook lever 105 to the engaging position shown in FIG. 11. Thereby the hook lever 105 engages the pin 104 of the base plate 108 to hold the cassette holder 100 within the main body 1. As a result, the keyboard 10 becomes level with the upper surface of the front portion of the main body 1 while the liquid crystal display panel 11 is risen at a certain angle. As is well known in the art, the visibility of display of a liquid crystal display panel depends on the incident angle of illumination light. However, the liquid crystal display panel 11 of this embodiment can provide a clear view of display since the panel surface of the liquid crystal display panel 11 faces upwards by being inclined at a certain angle.

Referring again to FIG. 4, in a base plate 108 of the cassette holder 100, there are formed a hall 119 through which the positioning pin 97 penetrates as well as halls 117 and 118 through which the driving shafts 73 and 74 penetrate, respectively. Consequently, the microfilm cassette 12 is placed in proper position by the positioning pin 97 so as to bring the hubs 14a of the microfilm supply and take up reels 13 and 14 into engagement with the driving shafts 73 and 74, respectively when the cassette holder 100 is sunk within the main body 1. As is seen in FIG. 9, the driving shaft 74 has a claw-shaped top portion 74a with its top end tapered which acts to rotate the microfilm take up reel 14 slightly in the direction where the microfilm is forwarded, namely in the clockwise direction (in FIG. 7) when the driving shaft 74 is brought into engagement with the hub 14a of the microfilm take up reel 14. The driving shaft 73 also has a claw-shaped top portion with its top end tapered which acts to rotate the microfilm supply reel 13 slightly in the rewinding direction, namely in the counterclockwise direction (in FIG. 7) when the driving shaft 73 is brought into engagement with the hub of the microfilm supply reel 13. Owing to the provision of the claw-shaped top end of each driving shaft 73, 74, the driving shafts 73 and 74 can be smoothly brought into engagement with the hubs of the microfilm supply and take up reels 13 and 14 without any wrong interlocking between the gears of the gear train in cooperation with the driving shafts 73 and 74 when the driving shafts 73 and 74 are brought into engagement with the microfilm supply and take up reels 13 and 14.

Figure 12:
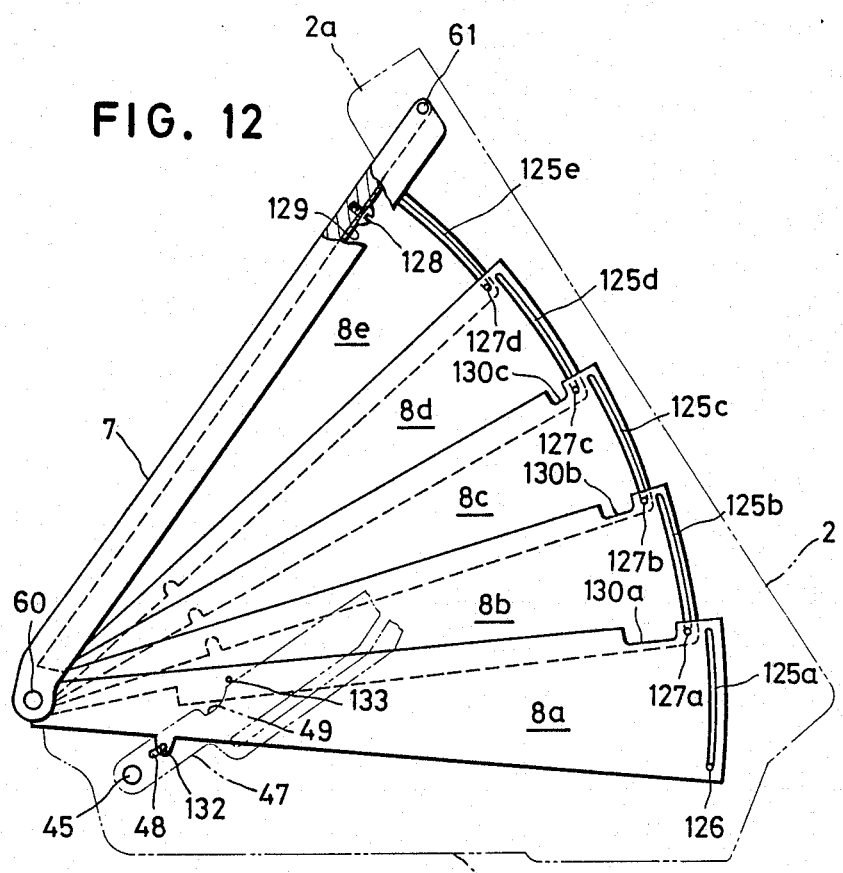
FIG. 12 is a side elevational view of an essential part of a light shielding means unfolded.
Figure 13:
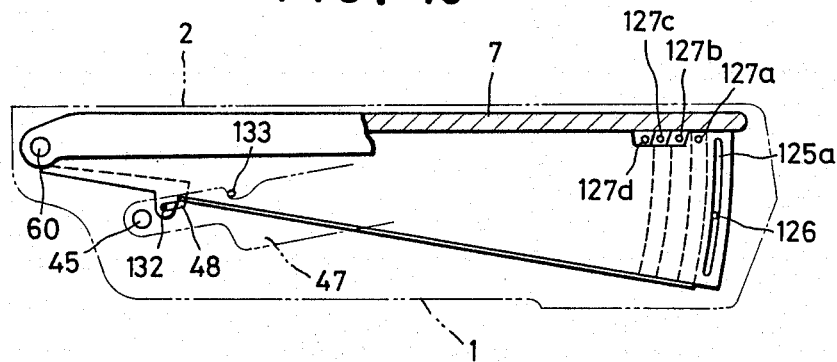
FIG. 13 is a side elevational view of the essential part of the light shielding means folded.

Referring now to FIGS., 12 to 15, the light shielding means 8 for creating a dark space behind the screen 5 risen up comprises a plurality of, for example in this embodiment five, light opaque blades 8a to 8e. These light opaque blades 8a to 8e are mounted on the shaft 60 of the screen frame 7 at their one distal ends for pivotal movement. As is seen in FIG. 12, these light opaque blades 8a to 8e are different in length from one another; specifically the lowermost one being longest and the uppermost one shortest, and arranged in order of length. At the opposite end of each light opaque blade 8a, 8b, 8c, 8d, 8e, there is formed a circular-arc slot 125a, 125b, 125c, 125d, 125e, respectively. The slot 125a of the light opaque blade 8a is engaged with a pin 126 laterally extending from the side wall of the main body 1. Each slot of the other slots 125b to 125e is engaged with a pin 127a, 127b, 127c, 127d provided on the adjacent more longer light opaque blade. The innermost or shortest light opaque blade 8e is provided with a raised and bent portion 129 at its upper edge thereof through which the shortest light opaque blade 8e is fixed to the screen frame 7 by use of a set screw 128 as is shown in FIG. 14. The raised and bent portion 129 also holds the viewing screen 5 from the rear side. According to the pin-slot engagement, the light opaque blades 8a to 8e are cooperatively drawn the innermost blade 8e first as the screen frame 7 is risen and partially overlapped on one another when being fully drawn. As a result, the light shielding means 8 ensures to keep the space behind the viewing screen 5 dark in cooperation with the top cover 2. As is clearly shown in FIG. 13 and 15, as the length of the light opaque blade is gradually shortened from the main body 1 to the viewing screen 5, the light opaque blades 8a to 8e can be folded without the pins 127a to 127d interfering with one another and thereby accommodated in a small space.

As is clearly shown in FIGS. 14 and 15, the lower edge of each opaque blade 8a, 8b, 8c, 8d, 8e is bent laterally inward. On the other hand, the opaque blades 8a to 8c are formed with notches 130a to 130c, respectively, which are different in width. Since the notch 130b is narrower than the notch 130a but wider than the notch 130c, heads of the pins 127b to 127d can be installed within these notches 130a to 130c when the blades 8a to 8e are folded.

The opaque blade 8a has, at its lower edge, a pin 132 engaged with a slot 48 of the mirror control lever 47 and the opaque blade 8b has, at its lower edge, a pin 133 engageable with the notch 49 of the mirror control lever 47. These pins 132 and 133 are adapted to restrict the light opaque blades 8a and 8b to move down when the light shielding means 8 is folded in cooperation with the down movement of the screen frame 7. More specifically, before the mirror control lever 47 is fully pushed down, the light opaque blades 8a and 8b are restricted in a position shown in FIG. 12 by the pins 132 and 133 while the remaining light opaque blades 8c to 8e falls down with their own weight. Consequently, there is no problem that an opening is produced at the lower end of the side wall 2a of the top cover 2 at the beginning of the down movement of the screen frame 7. Therefore, it is possible to prevent not only articles from entering into the inside of the microfilm reader but also fingers from being accidentally bitten by the edge of the side wall 2a of the top cover 2.

In actually using the microfilm reader described above, the AC plug 72 is at first coupled to the connector 73 to supply electric power to the power source unit 70. As a result, the control unit 71 is actuated to render the respective control circuits operative. For unfolding the microfilm reader, the push button 3 is pushed to release the hook 4, allowing the top cover 2 and the viewing screen 5 to rise up gently under the influence of force of the compression springs 43 and 55. If in fact the gentle rising-up of the top cover 2 and the viewing screen 5 is interrupted, the screen frame 7 is pulled to set up the viewing screen 5 and the mirror 35 in their in-use position. Simultaneously, the light opaque blades 8a to 8e folded are drawn in order and unfolded in the form of a generally sector shape, providing a dark space behind the viewing screen 5 in cooperation with the main body 1 and the top cover 2.

Figure 10:
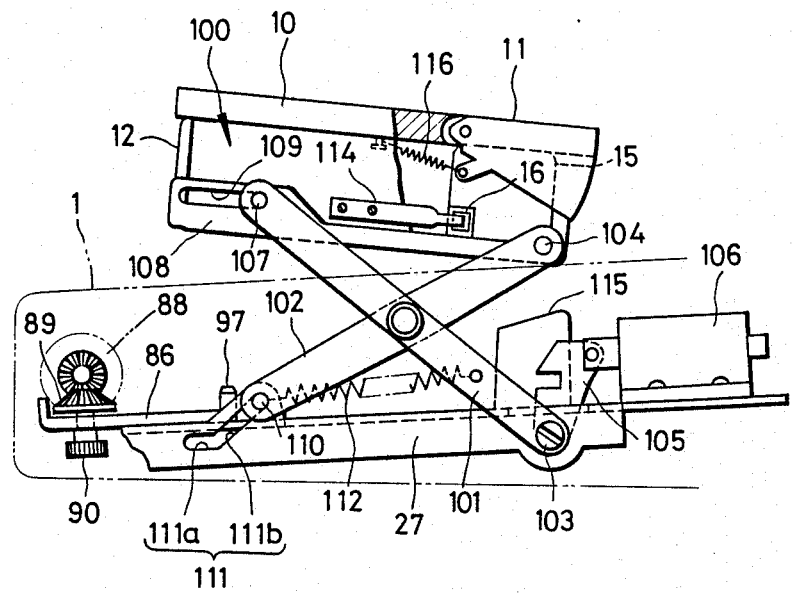
FIG. 10 is a side elevational view of an essential part of the cassette holder popped up.
Figure 11:
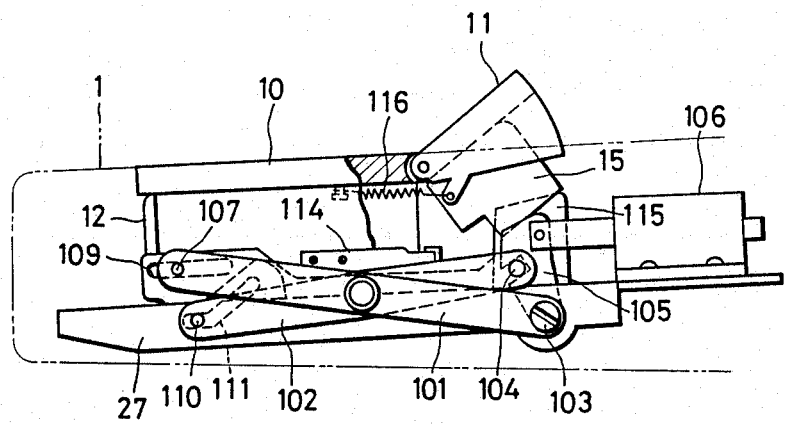
FIG. 11 is a side elevational view of the essential part of the cassette holder which is in its loaded position.

Set-up instructions is entered through one of function keys of the keyboard 10, causing the solenoid 106 to be energized for a predetermined period of time so as to move the hook 105 from the engaging position shown in FIG. 11 to the released position shown in FIG. 10, releasing the connecting pin 104. Consequently, the link levers 101 and 102 rise by the aid of the spring 112 to pop up the cassette holder 100 to the position shown in FIGS. 4 and 10. If it should be prevented to pop up the cassette holder 100 quickly, means is desirably incorporated therewith for controlling the movement of the link levers 101 and 102, such as an oil damper well known per se.

Into the cassette holder 100 thus popped up, the microfilm cassette 12 is inserted. As the result of the insertion of the cassette 12, the release member 16 of the microfilm cassette 12 is pushed laterally to release the guard panel 15. Then the keyboard 10 and the cassette holder 100 as a whole are pushed down against the spring 112 so as to contract or fold the link levers 101 and 102. At this time, the cassette holder 100 becomes at first parallel with the chassis 27 and then moves downwards. While the downward movement of the cassette holder 100, the lower edge of the guard panel 15 of the cassette holder 100 is abutted by the engaging member 115 to be opened in order to allow the cold mirror 25 to be placed in the space 18.

When pushing the cassette holder 100 thoroughly within the main body 1 for completing the loading operation of the microfilm cassette 12, the positioning pin 97 positions the microfilm cassette 12 in its proper position so as to engage the hubs 14a of the microfilm supply and take up reels 13 and 14 with the driving shafts 73 and 74. Simultaneously with this positioning, the magnetic tape 21 is positioned properly in the film gate between the condenser lens 29 and the pressure plate 30. By this time, the liquid crystal display panel 11 has been risen at a predetermined inclination of angle with respect to the keyboard 10 in cooperation with the opening of the guard panel 15.

After the completion of the loading of the microfilm cassette 12 in the microfilm reader, preparatory instructions are entered through one of the function keys of the keyboard 10 and the control unit 71 causes the motor 88 to rotate. The rotation of the motor 88 is transmitted to the idler gear 91. Consequently, the idler gear 91 is rotated in the clockwise direction seen in FIG. 8, causing the oscillating lever 94 to move so as to bring the coupling spur gear 95 being rotated in the counterclockwise direction into mesh with the reel gear 76. As a result, the reel gear 76 is rotated in the clockwise direction to rotate the microfilm take up reel 14, winding up the magnetic tape 21 connected to the leading end of the microfilm 20. While the magnetic tape 21 is wound up, the microfilm supply reel 13 rotates following the movement of the magnetic tape 21. Nevertheless, since the reel gear 75 will rotate following the rotation of the microfilm supply reel 13, the following gear 80 and the braking gear 83 exert load on the microfilm supply reel 13.

During the winding up of the magnetic tape 21, the magnetic head 140 (shown in FIG. 8) reads information recorded on the magnetic tape 21 to transmit the information to the control unit 71 wherein the information is stored in a memory incorporated therein. The information contains frame numbers of the images on the microfilm, a list of contents of the images corresponding to the frame numbers, and so forth. The information thus read is displayed on the liquid crystal display panel 11. When the magnetic tape 21 is completely wound up, the motor 88 is automatically stopped for completing the preparatory operation of the microfilm reader.

With reference to the information on the liquid crystal display panel 11, a frame number of the image to be retrieved is entered through the ten keys of the keyboard 10. The control unit 71 causes the motor 88 to rotate so as to forward the microfilm 20 in order to detect and count the blip marks 20a on the microfilm 20 with a photosensor 142 (shown in FIG. 8). Upon the frame to be retrieved is detected on the basis of the counted number of the blip marks, the control unit 71 stops the motor 88, causing the pressure plate 30 to press the microfilm 20 against the film gate, and actuats the lamp 23 to emit illumination light so as to project the image of the retrieved frame onto the viewing screen 5. It is of course that the pressure plate 30 is removed from the film gate during the microfilm 20 is being transported.

After the completion of the retrieval, the cassette 12 is unloaded by entering instructions through one of the function keys of the keyboard 10. The control unit 71 causes the motor 88 to rotate again so as to rewind the microfilm 20 and the magnetic tape 21 thoroughly around the microfilm supply reel 13. At the beginning of the rewinding of the microfilm 20 and the magnetic tape 21, the oscillating gear 95 is brought into mesh with the reel gear 75 and transmits the rotation of the motor 88 to the reel gear 75. During the rewinding of the microfilm 20, the reel gear 76 forces the microfilm take up reel 14 to rotate through the microfilm 20 with a tension exerted thereon. The tension exerted on the microfilm 20 is maintained properly because the reel gear 76 is braked by the braking gear 84, resulting in a stabilized microfilm transportation.

When the whole length of the microfilm 20 and the magnetic tape 21 are rewound around the microfilm supply reel 13, the control unit 71 energizes the solenoid 106 so as to retract the plunger, moving the hook 105 to the releasing position shown in FIG. 109, thereby releasing the connecting pin 104. Consequently, the link levers 101 and 102 gently rise to pop up the cassette holder 100, allowing an access to the microfilm cassette 12 for removal. For more easy removal, it is desirable to install such ejectors as employed in video players.

For folding up the microfilm reader, the screen frame 7 is pushed so as to bring down the screen lever 52 and the mirror control lever 47. Consequently, the top cover 2 is brought down through the engagement between the guide groove 58 and the pin 61 of the screen frame 7 as well as the mirror 35. Simultaneously with the bringing down of the top cover 2 and the mirror 35, the light shielding means 8 is folded causing opaque blades 8a to 8e fall down. Upon pushing down the viewing screen 5 to some extent, the top cover 2 is pushed so as to bring the hook 4 into engagement with the corresponding member of the main body 1. On the other hand, if the cassette holder 100 is left up, the cassette holder 100 is pushed down so as to bring the hook 105 into engagement with the connecting pin 104. At this time, since the cassette holder 100 is empty, the liquid crystal display panel 11 falls down. In such the way, the microfilm reader is completely folded in the form of the generally rectangular flattened box-like configuration as is shown in FIG. 1. The microfilm reader thus folded is very convenient for carrying about.

Although the present invention has been described in connection with the preferred embodiments thereof, it is to be noted that various modifications and changes are apparent to those skilled in the art. Such modifications and changes are to be understood as included within the scope of the present invention as defined in the appended claims unless they depart therefrom.

What is claimed is:

1. A portable microfilm reader having an optical system for magnifying and projecting onto a viewing screen an image recorded on a roll of microfilm contained in a cassette, said viewing screen being mounted on a shaft of a casing of said microfilm reader for folding and unfolding movement, said microfilm reader comprising:

means provided in said casing for accommodating said microfilm cassette therein;

means for transporting said microfilm so as to place a frame of said microfilm of which an image is to be projected by said optical system;

a reflecting mirror supported by said casing for sliding movement so as to be foldable in order to direct said projected magnified image toward said viewing screen;

a cover member mounted on and supported by said casing for folding and unfolding movement, said cover member being slidably engaged with a top end portion of said viewing screen so as to define a dark space behind said viewing screen in cooperation therewith when said viewing screen is unfolded and to cover and protect said viewing screen when said viewing screen is folded; and means for interconnecting said viewing screen and said reflecting mirror so as to fold and unfold said reflecting mirror in cooperation with said viewing screen.

2. A portable microfilm reader as defined in claim 1, wherein said reflecting mirror is supported by said casing for sliding movement so as to move toward said said shaft in cooperation with said folding movement of said viewing screen and to lay under said viewing screen.

3. A portable microfilm reader as defined in claim 1, further comprising light shielding means which includes a plurality of opaque blades adapted to be expanded and contracted in cooperation with said folding and unfolding movement of said viewing screen for enclosing a space defined by said casing, said cover member, and said viewing screen when said microfilm reader is unfolded, thereby keeping said space dark.

4. A portable microfilm reader as defined in claim 3, wherein said plurality of opaque blades are different in length from one another, pivoted at their own ends on said shaft and connected at their opposite ends to one another so as to partially overlap one another when expanded.

5. A portable microfilm reader as defined in claim 3, wherein each of said opaque blade has a sector-like shape.

6. A portable microfilm reader as defined in claim 3, wherein an opaque blade of said plurality of opaque blades is joined to a frame member attached with said viewing screen.

7. A portable microfilm reader as defined in claim 3, wherein said viewing screen is supported between an opaque blade and a frame member to which said viewing screen is attached.

8. A portable microfilm reader as defined in claim 3, wherein each of said plurality of opaque blades has a laterally inwardly bent lower edge.

9. A portable microfilm reader as defined in claim 1, further comprising an microfilm illumination system comprising a lamp and a reflecting mirror for reflecting illumination light emitted from said lamp so as to illuminate said microfilm, said reflecting mirror being a cold mirror for transmitting infrared light therethrough.

10. A portable microfilm reader as defined in claim 9, wherein said microfilm illumination system further comprises a condenser lens located behind said microfilm to be illuminated.

11. A portable microfilm reader as defined in claim 9, wherein said reflecting mirror is supported on a metal plate so as to absorb and release heat from said reflecting mirror.

12. A portable microfilm reader as defined in claim 1, wherein said shaft pivoting said viewing screen thereon is disposed near the middle of said casing and said reflecting mirror is slidably supported by said casing between said shaft and the rear end of said casing, and further comprising a power source circuit unit disposed in said casing between said reflecting mirror and the rear end of said casing for receiving electric current from AC power source.

13. A portable microfilm reader having an optical system for magnifying and projecting onto a viewing screen an image recorded on a roll of microfilm contained in a cassette, said viewing screen being mounted on a shaft of a casing of said microfilm reader for folding and unfolding movement, said microfilm reader comprising:
 means provided in said casing for accommodating said microfilm cassette therein;
 means for transporting said microfilm so as to position a frame of said microfilm of which an image is to be projected and magnified by said optical system;
 a reflecting mirror supported by said casing for sliding movement so as to be foldable in order to direct said projected magnified image toward said viewing screen;
 a cover member mounted on and supported by said casing for folding and unfolding movement, said cover member having slot means formed therein for slidably supporting an engaging member fixedly attached to a top end portion of said viewing screen so as to define a dark space behind said viewing screen in cooperation therewith when said viewing screen is unfolded and to cover and protect said viewing screen when said viewing screen is folded; and
 means for interconnecting said viewing screen and said reflecting mirror so as to fold and unfold said reflecting mirror in cooperation with said viewing screen.

14. A portable microfilm reader as defined in claim 13, wherein said interconnecting means comprises a mirror control lever and a link lever pivoted at the middle of said mirror control lever, said mirror control lever being pivotally connected to said casing at its one end and to said reflecting mirror at the other end and said link lever being pivotally connected to said viewing screen at its one end and slidably engaged with a cam slot formed in said mirror control lever at the opposite end, thereby enabling folding and unfolding said reflecting mirror in cooperation with said viewing screen, and wherein said means for pivotably connecting said lever and said mirror is slidably disposed in said slot means.

15. A portable microfilm reader as defined in claim 11, wherein said slot means has an enlarged portion at a lower end for allowing free movement of said engaging member and said means for pivotably connecting said lever and said mirror.

16. A portable microfilm reader having an optical system for magnifying and projecting onto a viewing screen an image recorded on a roll of microfilm contained in a cassette, said viewing screen being mounted on a shaft of a casing of said microfilm reader for folding and unfolding movement, said microfilm reader comprising:
 means provided in said casing for accommodating said microfilm cassette therein;
 means for transporting said microfilm so as to position a frame of said microfilm of which an image is to be projected and magnified by said optical system;
 a reflecting mirror supported by said casing for sliding movement so as to be foldable in order to direct said projected magnified image toward said viewing screen;
 a cover member mounted on and supported by said casing for folding and unfolding movement, said cover member being slidably engaged with a top end portion of said viewing screen so as to define a dark space behind said viewing screen in cooperation therewith when said viewing screen is unfolded and to cover and protect said viewing screen when said viewing screen is folded; and
 means for interconnecting said viewing screen and said reflecting mirror so as to fold and unfold said reflecting mirror in cooperation with said viewing screen wherein said interconnecting means comprises a mirror control lever and a link lever pivoted at the middle of said mirror control lever, said mirror control lever being pivotally connected to said casing at its one end and to said reflecting mirror at the other end and said link lever being pivotally connected to said viewing screen at its one end and slidably engaged with a cam slot formed in said mirror control lever at the opposite end, thereby folding and unfolding said reflecting mirror in cooperation with said viewing screen.

* * * * *